Patented Dec. 28, 1943

2,337,825

UNITED STATES PATENT OFFICE 2,337,825

PROCESS OF PREPARING AN N-ACETYL AROMATIC AMINE

George G. Lahr and Wilbur T. Daddow, Wilmington, Del., assignors to E. I. du Pont de Nemours & Company, Wilmington, Del., a corporation of Delaware No Drawing. Application December 13, 1941, Serial No. 422,881

5 Claims. (Cl. 260—562)

A. This invention relates to the acetylation of aromatic amines and in particular to the preparation of acetyl para-toluidine by the acetylation of para-toluidine by acetic anhydride.

B. Many ways of acetylating aromatic amines have been tried and have been successful insofar as the mere progress of the reaction is concerned. So far as the quality of the product and the efficiency of the reaction are concerned, those processes all have disadvantages. The process of Beilstein and Kuhlberg, Ann. 156, 74, requires an extended boiling under reflux and the use of a high temperature around 200-250° C. and produces a product of somewhat dark color. The process of Meisenheimer and Hess, Berichte, 52, 1167 (1919) requires the use of one mole or more of acetic anhydride for each mole of amine. The process of Kaufmann, Berichte, 42, 3481 (1909), involves the use of a solvent which must be removed from the reaction mass before the acetylated amine can be used. The process also has an unsatisfactory yield. The process of Morgan and Micklethwait, Journal Chemical Society 103, 1399-1400 (1913), requires the use of acetic acid plus acetic anhydride or acetyl chloride, too much time, and special acid-resistant equipment because hydrochloric acid is liberated. The process of U. S. P. 586,551 (July 20, 1897) requires too long a time and an excess of aniline which must be recovered. D. R. P. 98,070 (March 10, 1897) uses weak acetic acid under pressure, which takes too long. The process of U. S. P. 1,878,969 (September 20, 1932) uses an aliphatic carboxylic acid, too long a time in the reactor and an inert atmosphere, such as carbon dioxide.

C. The object of this invention is to provide a process for the manufacture of N-acetyl-aromatic amines whereby the desired compound is obtained in good yield and a high state of purity. A further object is to provide a process, the acetylation step of which can be completed in a short time with an economical usage of materials. A still further object is to provide a process, the acetylation step of which can be completed at a moderate temperature without super-atmospheric pressure.

D. The objects of the invention are attained, generally speaking, by reacting an aromatic amine with acetic anhydride under reflux until a substantial quantity of the anhydride has been consumed, the anhydride being present in a molecular quantity something more than half that of the amine; the weak acetic acid which is formed during the reaction is distilled off, preferably under vacuum, and the reaction is continued with the addition of a molecular quantity of acetic anhydride approximately equal to the unacetylated amine remaining in the reaction mass. The total quantity of anhydride required is less than one mole per mole of aromatic amine.

E. Our method of operation is as follows: To one mole of aromatic amine add 0.55 to 0.65 mole of acetic anhydride allowing the temperature to rise, and then heat to boiling (140°-160° C.) for about 1½ to 3 hours under a reflux condenser. Then set apparatus for distillation and vacuum distill weak acetic acid from the charge. Then add acetic anhydride in about equal molecular proportion to the unacetylated amine left after removal of the weak acetic acid. This amount brings the total acetic anhydride used to 0.70 to 0.85 mole per mole of aromatic amine.

F. The following examples are illustrative but in nowise limitative of the invention:

Example I

Our preferred method of operation is as follows, using para-toluidine in the example: To 160.5 parts (1.5 gram mols) of para-toluidine 88 parts (0.86 gram mole) of acetic anhydride were added little by little, allowing the temperature to rise, and the mixture was heated to reflux temperature after all the anhydride has been added, and maintained at reflux temperature (150-160° C.) for about 1½ to 1¾ hours. Vacuum was applied with no heat on the still; dilute acetic acid was slowly distilled off, the vacuum being raised as the temperature dropped. The bulk of the acetic acid distilled during the crystallization of the mass, which occurred at about 115°-125° C. under a vacuum of 22 to 26 inches of mercury. When the weak acetic acid had been removed, the vacuum was released and 25.5 grams (0.25 gram mole) of acetic anhydride were added to the charge and heated at 150°-160° C. for a half-hour, at which time the acetylation was essentially completed (99-100%).

Example II

The acetylation of aniline may serve as a further example of our method: One gram mole of aniline (93 grams) was treated with 0.62 gram mole (66.5 grams of 95%) acetic anhydride and heated to boiling under a reflux condenser. The temperature was about 140°-160° C. At the end of four hours about 90-92% of the aniline has been acetylated. The weak acetic acid was removed by vacuum distillation and to the residue were added 0.10 to 0.12 gram mole (11 to 13 grams 95%) of acetic anhydride, the mass being heated to 150°–160° C. for one-half to one hour at which time the acetylation of the aniline was essentially completed (99–100%).

*Example III*

The use of a large proportion of acetic anhydride in the initial step shortens the heating time and also requires less acetic anhydride in the second step to complete the acetylation. Example: To one gram mole (93 grams) of aniline add 0.84 gram mole (90 grams of 95%) acetic anhydride and boil at 150°–160° C. for two hours. The acetylation is 97%–98% complete at this point. After distilling off the weak acetic acid under vacuum, the residue will require only 0.02 to 0.04 gram mole of acetic anhydride to substantially complete the acetylation of the aniline.

*Example IV*

Some advantages of the invention can be obtained by a one-step process, although a two-step addition of anhydride is preferred: To 107 grams (1 gram mole) of para-toluidine add 91 grams of 95% acetic anhydride (0.85 gram mole) and heat under reflux for two hours. At the end of the heating period, the acetylation is essentially complete, i. e., 99.5%–100%.

G. Other aromatic amines may be acetylated by this process, for example, ortho- and meta-toluidine, the anisidines, the phenetidines, and the naphthylamines.

H. The order in which the materials are added to the reaction vessel may be changed without departing from the invention. The temperatures may be changed and made lower or higher in order to obtain the optimum results from the reaction, taking into consideration the reactants. In general, the temperatures which have been given indicate a desirable and successful range, rather than a limitation. The temperature at which the mixture boils and can be refluxed is usually satisfactory. It is preferred to add the acetic anhydride in two steps, removing acetic acid between them. It is possible to use more than two additions of the anhydride with the removal of acid, but the limit of efficiency is soon reached. The two-step process is adequate and satisfactory.

I. The preferred process has the following advantages: The acetylation of amines is accomplished with less than one mole of acetic anhydride for each mole of amine; the acetylation of amines is accomplished in much less time than acetic acid acetylations disclosed in the art; the acetylation of amines is accomplished in relatively simple equipment which can be heated with low pressure steam, and no pressure equipment or high pressure steam heating equipment need be used; the acetylation of amines is accomplished simply, without using high temperatures; the acetylation mass has a high content of acetyl amine, there being only a small amount of acetic acid left at the end of the acetylation, so that it is suitable for use in succeeding operations, such as nitration, without purification or isolation; the process is economical to operate; and the yield and quality, especially in regard to the color of the product, are excellent.

J. As many apparently widely different embodiments of this invention may be made without departing from the spirit and scope thereof, it is to be understood that we do not limit ourselves to the specific embodiments thereof except as defined in the appended claims.

We claim:

1. The process of preparing acetyl para-toluidine which comprises mixing para toluidine with acetic anhydride in the ratio of about 1 to .54, respectively, heating to reflux temperature for about one and a half hours, distilling off dilute acetic acid under increasing vacuum while reducing the temperature to that at which crystallization occurs, adding .15 acetic anhydride to the charge and heating to 150–160° C. until acetylation is substantially complete.

2. The process of making acetyl para-toluidine which comprises adding about .6 mole of acetic anhydride to about one mole of para toluidine little by little, heating the mixture in the initial absence of water to boiling under reflux until a substantial part of the anhydride has been consumed, removing acetic acid from the mixture under vacuum and adding acetic anhydride to the mixture, the total amount of acetic anhydride added being less than one mole per mole of para-toluidine.

3. The process of preparing an acetylated aromatic amine which comprises adding acetic anhydride to the aromatic amine in the ratio of about one-half mole of anhydride to about one mole of the amine, refluxing the mixture in the initial absence of water until a substantial part of the anhydride has been consumed, removing acetic acid from the mixture, and adding acetic anhydride to the mixture, the total amount of acetic anhydride added being less than one mole per mole of aromatic amine.

4. The process of preparing an acetylated aromatic amine which comprises reacting the aromatic amine with acetic anhydride, the aromatic amine being in substantial excess, until a substantial part of anhydride has been consumed, removing acetic acid from the mixture, and continuing the reaction in the presence of an additional amount of acetic anhydride, the total amount of acetic anhydride added being less than one mole per mole of aromatic amine.

5. The process which comprises acetylating an aromatic amine by reaction with acetic anhydride in the absence of an aqueous medium, the acetic anhydride being present in less than equimolecular quantity.

GEORGE G. LAHR.
WILBUR T. DADDOW.